United States Patent [19]

Gellert

[11] Patent Number: 5,125,827
[45] Date of Patent: Jun. 30, 1992

[54] INJECTION MOLDING APPARATUS HAVING AN INSULATIVE AND RESILIENT SPACER MEMBER

[76] Inventor: Jobst U. Gellert, 7A Prince Street, Georgetown, Ontario, Canada, L7G 2X1

[21] Appl. No.: 785,253

[22] Filed: Nov. 4, 1991

Related U.S. Application Data

[63] Continuation of Ser. No. 576,842, Sep. 4, 1990, abandoned.

[30] Foreign Application Priority Data

Jul. 27, 1990 [CA] Canada .................................. 2022123

[51] Int. Cl.⁵ .............................................. B29C 45/17
[52] U.S. Cl. ...................................... 425/549; 267/161; 411/155; 411/156; 411/544; 411/545; 425/572
[58] Field of Search ................... 425/549, 472; 16/2; 411/544, 545, 155, 156; 267/160, 161, 156, 290

[56] References Cited

U.S. PATENT DOCUMENTS

| | | | |
|---|---|---|---|
| 998,511 | 7/1911 | Heron | 411/545 |
| 1,143,091 | 6/1915 | Stimpson | 16/2 |
| 1,481,515 | 1/1924 | Kraft | 411/545 |
| 4,344,205 | 8/1982 | Latino et al. | 16/2 |
| 4,576,567 | 3/1986 | Gellert | 425/549 |
| 4,588,367 | 5/1986 | Schad | 425/549 |
| 4,740,151 | 4/1988 | Schmidt et al. | 425/549 |
| 4,768,945 | 9/1988 | Schmidt et al. | 425/549 |

FOREIGN PATENT DOCUMENTS 7415863 6/1976 Netherlands .................. 411/545

Primary Examiner—Tim Heitbrink
Attorney, Agent, or Firm—Griffin Branigan & Butler

[57] ABSTRACT

An insulative and resilient spacer member to be mounted between a heated manifold and a cooled clamp plate in an injection molding system. The spacer member has a plurality of V-shaped concentric rings. It has a uniform cross section with a number of web portions extending diagonally between alternate forward and rearward ridge portions. The outer surfaces of the alternate ridge portions are aligned to provide forward and rearward sides of the spacer member which extend parallel a predetermined distance apart. Some of the outer surfaces have an inwardly extending insulative circular groove. The spacer member is formed of steel to have a predetermined combination of strength, resilience and reduced thermal conductivity.

7 Claims, 2 Drawing Sheets

INJECTION MOLDING APPARATUS HAVING AN INSULATIVE AND RESILIENT SPACER MEMBER

This application is a continuation of Ser. No. 07/576,842, filed Sep. 4, 1990, now abandoned.

BACKGROUND OF THE INVENTION

This invention relates generally to injection molding and more particularly to an insulative and resilient spacer member to be mounted to provide an air space of a precise width between heated and cooled components of an injection molding system.

The use of spacers or pressure pads to provide insulative air spaces while withstanding very considerable injection forces are well known in the art. For instance, a solid pressure pad made of titanium to reduce heat loss is shown mounted between the heated manifold and cooled back plate in U.S. Pat. No. 4,768,945 to Schmidt et al. which issued Sep. 6, 1988. In addition to being expensive, these pressure pads have the disadvantage that they are not resilient to allow for thermal expansion and/or some slight variations in component tolerances and injection forces. A combination sealing and retaining bushing having a slightly resilient outer flanged portion for a valve gated injection molding system is described in U.S. Pat. No. 4,740,151 to Schmidt et al. which issued Apr. 26, 1988. U.S. Pat. No. 4,588,367 to Schad which issued May 13, 1986 shows a support element which is compressible to allow for thermal expansion. While these prior devices or arrangements are suitable for particular situations or applications, they have the disadvantages that they are relatively costly to make and do not have a broad application for a variety of different injection molding systems. Furthermore, with the development of smaller injection molding systems and the use of more temperature sensitive molding materials, the degree of resilience and the reduced thermal conductivity of the spacer member have become much more critical.

SUMMARY OF THE INVENTION

Accordingly, it is an object of the present invention to at least partially overcome the disadvantages of the prior art by providing a spacer member made of steel which has a predetermined combination of strength, resilience and reduced thermal conductivity.

To this end, in one of its aspects, the invention provides an injection molding insulative and resilient spacer member having forward and rearward sides which extend parallel a predetermined distance apart, the spacer member having a plurality of V-shaped concentric rings which provide a uniform cross section having a plurality of web portions extending diagonally between alternate forward and rearward ridge portions, the ridge portions each having an outer surface, the outer surfaces of the forward ridge portions being aligned to form the forward side of the spacer member, and the outer surfaces of the rearward ridge portions being aligned to form the rearward side of the spacer member.

Further objects and advantages of the invention will appear from the following description taken together with the accompanying drawings.

DETAILED DESCRIPTION OF THE PREFERRED EMBODIMENTS

Figure 1:
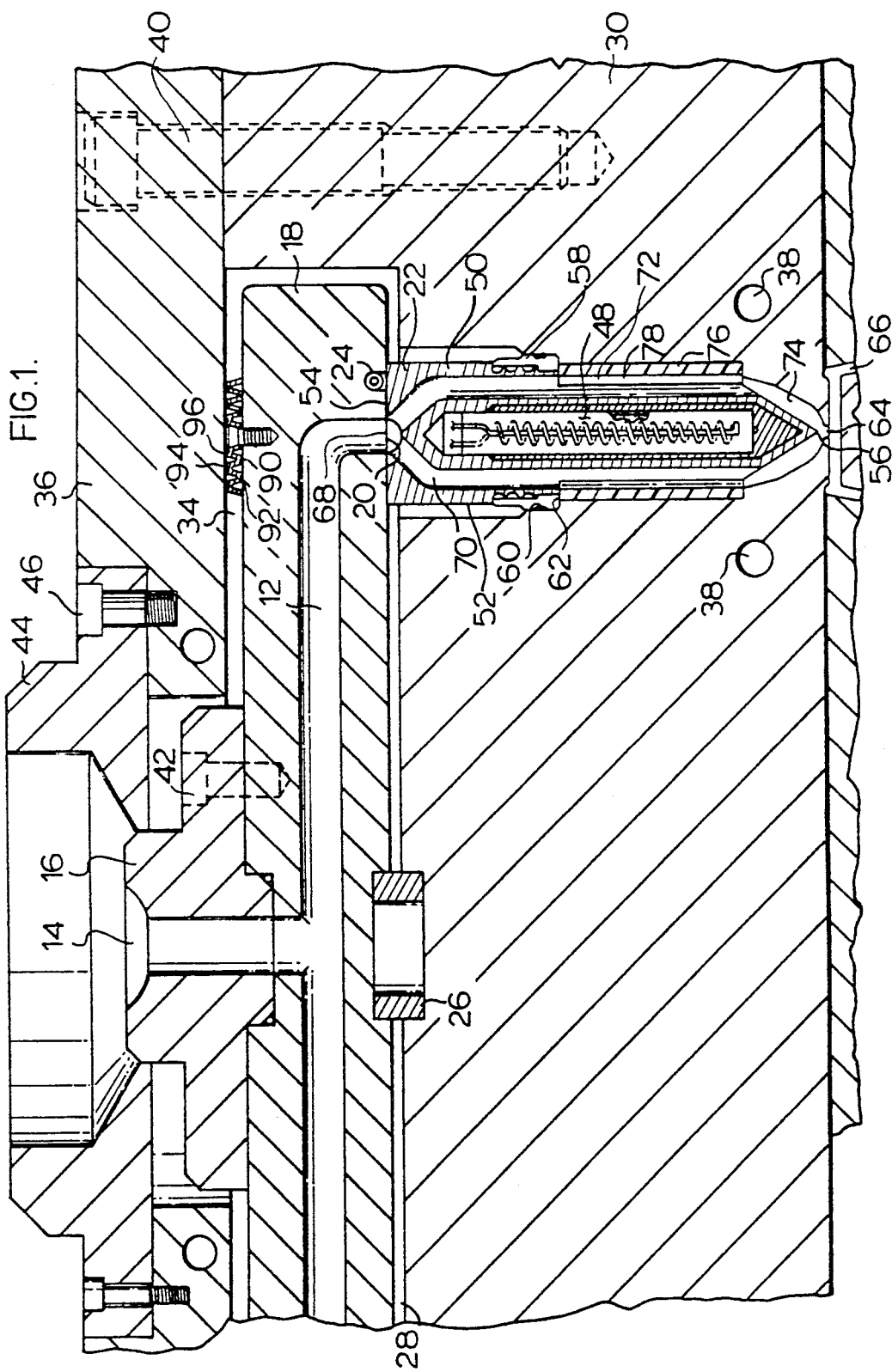
FIG. 1 is a sectional view of a portion of an injection molding system showing a spacer member according to a preferred embodiment of the invention.

Reference is first made to FIG. 1 which shows a portion of a multi-cavity injection molding system using spacer members 10 according to a preferred embodiment of the invention. A melt passage 12 extends from a common inlet 14 in a manifold extension 16 to an elongated manifold 18 where it branches out to a number of outlets 20. Each outlet 20 leads to a heated probe 22 which is similar to that described in the applicant's U.S. Pat. No. 4,576,567 which issued Mar. 18, 1986. While a particular system is shown using heated probes 22, the spacer members 10 according to the invention can be used equally as well with a variety of other injection molding systems using either heated probes or heated nozzles.

The elongated manifold 18 is heated by an electrical heating element 24 which is integrally brazed into it. The manifold 18 is secured in position by a central locating ring 26 which bridges an insulative air space 28 between the heated manifold 18 and a cooled cavity plate 30, and by the spacer members 10 which are described in greater detail below. The spacer members 10 are mounted by screws 32 to provide an insulative air space 34 of a predetermined width between the heated manifold 18 and the cooled clamp plate 36. The cavity plate 30 and the clamp plate 36 are cooled by pumping cooling water through cooling conduits 38. The clamp plate 36 is secured in place by bolts 40 which extend into the cavity plate 30. The manifold extension 16 is, in turn, held in place by screws 42 and a locating collar 44 which is secured to the clamp plate 36 by screws 46.

Each probe 22 has an electrical cartridge heater 48 which is centrally located in a body 50 made of a tool steel such as H13. The body 50 has an outer surface 52, a rear end 54 and a pointed forward end 56. The probe 22 has an integral insulation and locating hoop portion 58 which is also made of a tool steel such as H13. Each probe 22 is seated in a well 60 in the cavity plate 30 with the hoop portion 58 resting on a circumferential shoulder 62 to locate the pointed forward end 56 in alignment with a gate 64 extending through the cavity plate 30 to a cavity 66. Each probe 22 is held securely in this position by the manifold 18 abutting tightly against its rear end 54. Each outlet 20 of the melt passage 12 from the manifold 18 is aligned with an inlet 68 to each probe 22 from which a pair of melt channels 70 extend diagonally outward to join longitudinally extending groves 72. These grooves 72 extend into a space 74 around the conical forward end 56 of the probe 22. A generally cylindrical insulating sleeve 76 is located between the probe 22 and the well 60. The sleeve 76 is formed of a thermoplastic material having a high melting temperature and a low thermal conductivity such as PEEK (a trade name for polyetheretherketone). It fits over a downstream portion of the probe and has a pair of inwardly open grooves 78 which align with the outwardly open grooves 72 of the probe 22.

Figure 2:
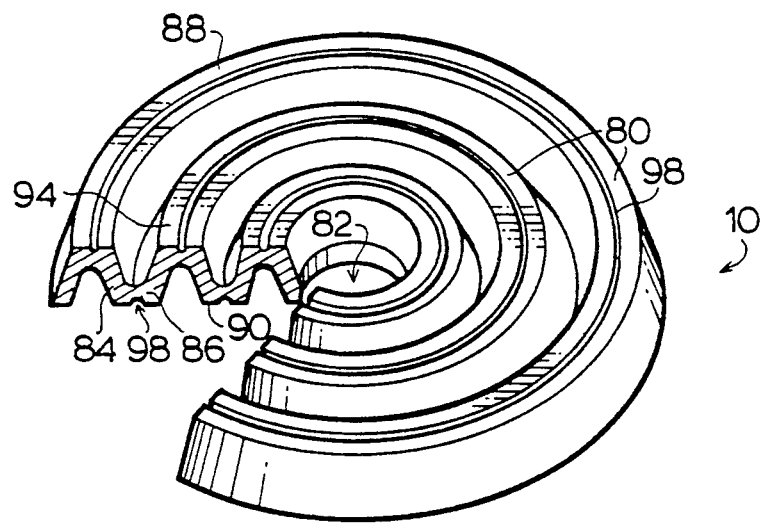
FIG. 2 is a partially cut-away isometric view of the spacer member seen in FIG. 1.

Reference is now made to FIG. 2 for a more detailed description of the spacer members 10 according to a preferred embodiment of the invention. As can be seen, each spacer member 10 is circular with a number of V-shaped concentric rings 80. The spacer member 10 is made of a suitable high strength tool steel such as H13 or 420 Stainless and has a central opening 82 therethrough to receive the retaining screw 32. The rings 80 form a uniform cross section with a number of web portions 84 extending diagonally between alternate forward and rearward ridge portions 86,88. As seen in FIG. 1, the forward ridge portions 86 have outer surfaces 90 which are aligned to form the forward side 92 of the spacer member 10, and the rearward ridge portions 88 have outer surfaces 94 which are aligned to form the rearward side 96 of the spacer member 10. The spacer member 10 is made with the forward and rearward sides 92,96 extending parallel to each other a precise predetermined distance apart. The structure of the spacer members 10 provides them with a resilience of about 0.001 to 0.002 inches under the substantial injection forces between the manifold 18 and the clamp plate 36. Thus, the width of the spacer members 10 determines the width of the air space 34 and accurately positions the manifold 18 and the probes 10. The outer surfaces 90,94 of the ridge portions 86,88 are generally flat, but in this embodiment, the outer surfaces of the wider ridge portions where two web portions 84 join each have an inwardly extending circular groove 98. The dimensions and number of the web portions 84 and these grooves 98 in the ridge portions 86,88 provide the spacer member 10 with a specific predetermined thermal conductivity. Thus, the spacer members 10 according to the invention have a very desirable combination of strength resilience and reduced thermal conductivity.

In use, the system is assembled with a probe 22 leading to each gate 64 as shown in FIG. 1. Power is applied to heat the manifold 18 and the probes 22 to a predetermined operating temperature. Hot pressurized melt is then introduced into the melt passage 12 though the recessed inlet 14 from a molding machine (not shown) according to a predetermined cycle. The melt branches in the manifold 18 and again when it reaches the inlet 68 to each probe 22. Part of the melt flows through the channel 70 and groove 72 on each side of the probe 22 to the space 74 around the pointed forward end 56 of the probe 22. From there it flows through the gate 64 and fills the cavity 66. After the cavities 66 are full, injection pressure is held for a short packing period and then released. The mold is then opened to eject the product, and the process is repeated.

Figure 3:
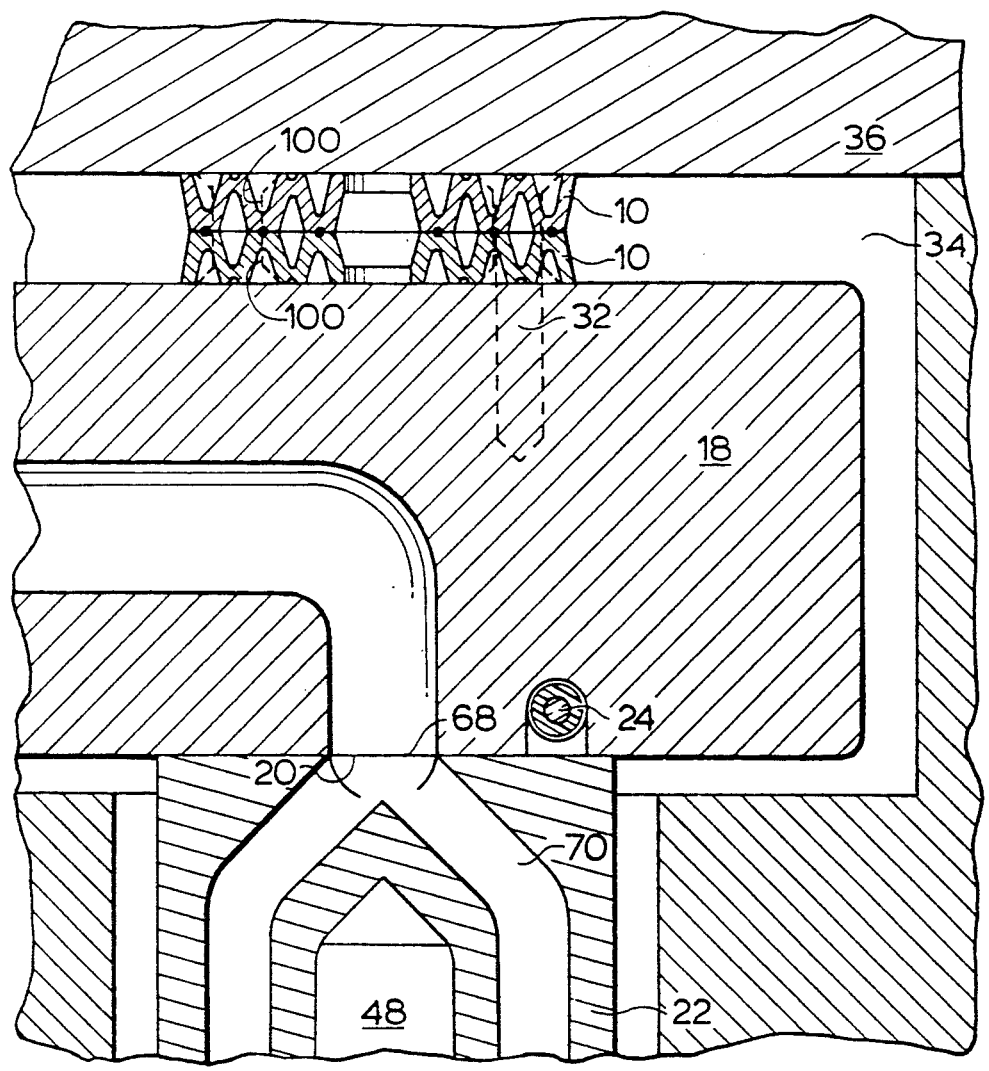
FIG. 3 is a sectional view of a portion of an injection molding system using two spacer members mounted together to double the width of the insulative air space.

FIG. 3 is provided to show another use or application of the spacer members 10 according to the invention. In this system, two spacer members 10 are mounted to abut against each other which effectively doubles the width of the air space 34 between the heated manifold 18 and the cooled clamp plate 36. Otherwise the structure and use of the injection molding system partially illustrated in FIG. 3 is the same as that given above, and the description need not be repeated.

While the description of the spacer member according to the invention has been given with respect to a particular embodiment, it is not to be construed in a limiting sense. Variations and modifications will occur to those skilled in the art. In particular, it is apparent that the number of rings 80 and the dimensions of the spacer member 10 could be different for different applications. Reference is made to the attached claims of a definition of the invention.

In this embodiment, each spacer member has two screw holes 100 offset from the center and they are held in place by one or two screws 32 in case the central opening 82 or other hole 100 is in a different location for a screw.

What I claim is:

1. In an injection molding apparatus having adjacent heated and cooled components and wherein an insulating air space between said adjacent heated and cooled components is maintained by at least one spacer member disposed in said air space, the improvement comprising an insulating and resilient spacer member having:

a forward and a rearward side which extend parallel and spaced a constant, predetermined distance apart, the spacer member having a plurality of integral concentric rings, the rings having identical uniform V-shaped cross sections which provide a plurality of web portions extending diagonally between alternate forward and rearward ridge portions, the ridge portions each having a flat outer surface, the outer surfaces of the forward ridge portions being aligned to form the forward side of the spacer member, and the outer surfaces of the rearward ridge portions being aligned to form the rearward side of the spacer member.

2. The injection molding apparatus as claimed in claim 1 wherein the outer surface of at least one ridge portion has a circular groove extending inwardly therefrom.

3. The injection molding apparatus as claimed in claim 1 wherein the spacer member has a central opening extending therethrough between the forward and rearward sides.

4. The injection molding apparatus as claimed in claim 1 wherein the spacer member is made of steel.

5. The injection molding insulative and resilient spacer member as claimed in claim 1, wherein the heated component is a manifold.

6. The injection molding insulating and resilient spacer member as claimed in claim 5, wherein the cooled component is a clamp plate.

7. The injection molding insulating and resilient spacer member as claimed in claim 5, wherein two spacer members are mounted in the air space so as to abut against each other and so as to effectively double the width of the air space.

* * * * *